United States Patent [19]

Hayashi

[11] Patent Number: 4,631,021
[45] Date of Patent: Dec. 23, 1986

[54] APPARATUS FOR QUANTIFYING THE FLOW RATE OF DOUGH

[75] Inventor: Torahiko Hayashi, Utsunomiya, Japan

[73] Assignee: Rheon Automatic Machinery Co., Ltd., Japan

[21] Appl. No.: 718,126

[22] Filed: Apr. 1, 1985

[30] Foreign Application Priority Data

Apr. 3, 1984 [JP] Japan .................................. 59-65837
May 21, 1984 [JP] Japan .................................. 59-102321

[51] Int. Cl.$^4$ .................................................. B29C 47/92
[52] U.S. Cl. ........................................ 425/140; 198/505; 264/40.4; 264/40.7; 425/148
[58] Field of Search ...................... 264/40.4, 40.7, 168, 264/284; 425/140, 148; 198/505

[56] References Cited

U.S. PATENT DOCUMENTS

| | | | |
|---|---|---|---|
| 3,134,138 | 5/1964 | Pufahl | 264/167 |
| 3,387,330 | 6/1968 | Lemelson | 423/112 |
| 3,632,258 | 1/1972 | Faerber | 425/223 |
| 4,233,255 | 11/1980 | Moon | 264/40.4 |
| 4,398,877 | 8/1983 | Taylor | 425/145 |
| 4,583,930 | 4/1986 | Hayashi | 425/148 |

Primary Examiner—Donald Czaja
Assistant Examiner—Jennifer Cabaniss
Attorney, Agent, or Firm—Guy W. Shoup

[57] ABSTRACT

An apparatus and method for quantifying the flow rate of dough by controlling the speed of a feed conveyor when the dough is transferred from the feed conveyor onto a constant-speed conveyor. Dough is weighed and the movement of the feed conveyor is controlled at a speed inversely proportional to the weighed measurements, whereby the dough is stretched or compressed cooperatively with two pressing means to make constant the weight of dough per unit length.

10 Claims, 5 Drawing Figures

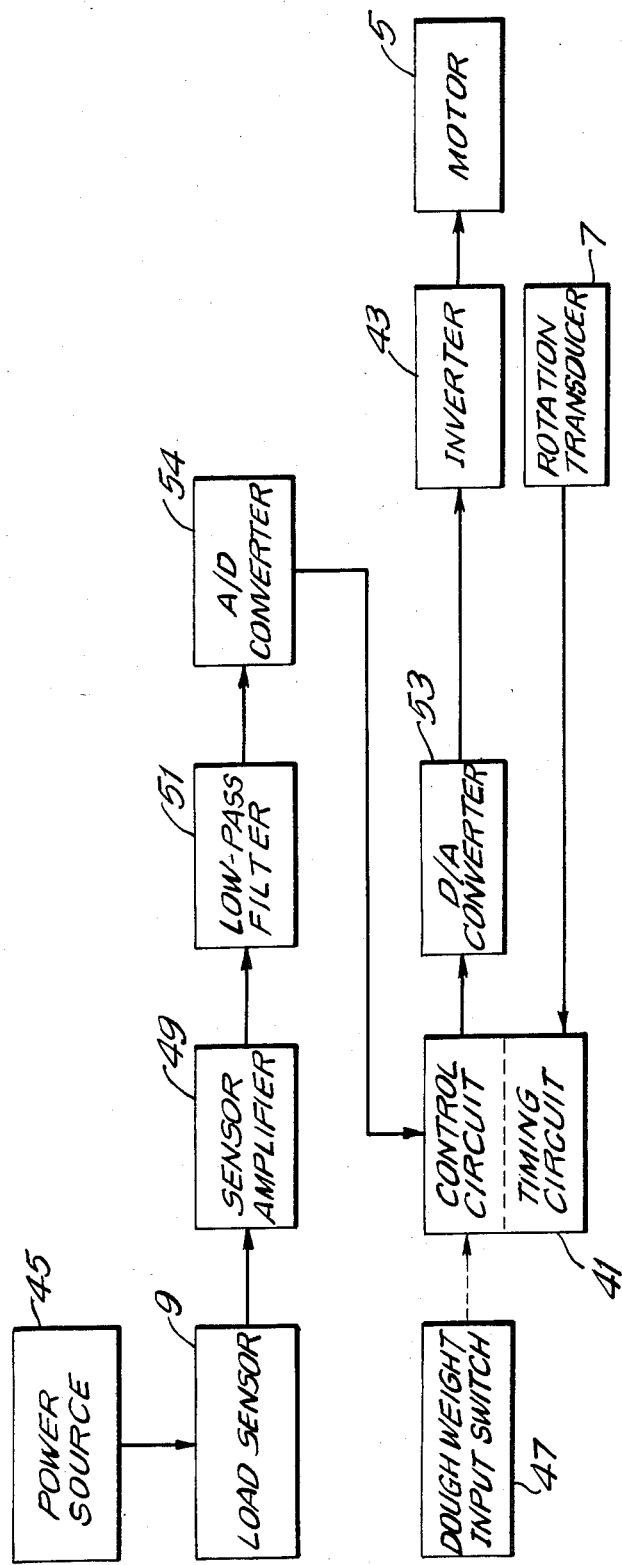
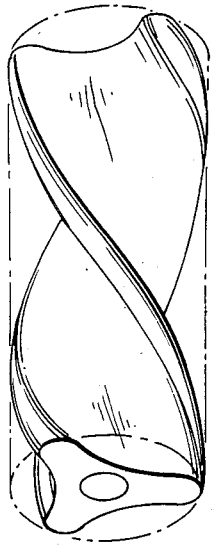
FIG.2
FIG.5

APPARATUS FOR QUANTIFYING THE FLOW RATE OF DOUGH

BACKGROUND OF THE INVENTION

1. Field of the Invention

This invention relates to an apparatus and method for quantifying the flow rate of plastic dough having an elasticity and a viscosity, such as bread dough, fish paste or other high-molecular materials while the dough is conveyed. More particularly it relates to such apparatus and method whereby a pressure or a stirring force to the dough is prevented.

2. Description of the Prior Art

In a system feeding plastic dough having an elasticity and a viscosity such as, for example, bread dough, extrusion by a screw apparatus or extrusion by an extruding apparatus using a piston and a cylinder has been used for continuously or intermittently feeding dough.

These apparatus, however, have been defective in that they need a large size, and an excessive pressure is frequently imparted to the dough fed, or the dough is frequently severed with the screw during stirring. In the case of bread dough, especially, the gel structure of the dough tends to be destroyed due to the pressure or stirring, and an extra step is required later for the recovery of the gel structure.

SUMMARY OF THE INVENTION

It is an object of the present invention to provide an apparatus for continuously quantifying the flow rate of dough having an elasticity and a viscosity, such as, bread dough, while the dough is conveyed. Another object of the invention is to provide a method of continuously quantifying the flow rate of dough without requiring extrusion or stirring.

A further object of the invention is to provide an apparatus and method for continuously quantifying the flow rate of dough when the dough is transferred from a feed conveyor to a constant-speed conveyor arranged in series with the feed conveyor.

In accordance with the present invention, an apparatus for quantifying the flow rate of dough is provided, which comprises a feed conveyor assembly for continuously feeding the dough, a dough weighing device continuously measuring the weight of each portion of the dough conveyed past the weighing device, said dough weighing device being located between the opposite ends of the conveying portion of said feed conveyor assembly, a first pressing means disposed at a predetermined fixed position above and adjacent to the rear end of said feed conveyor assembly, said first pressing means being adapted to rotate about its own axis at substantially the same linear speed as the conveyor speed of at least the rear end portion of said feed conveyor assembly, a constant-speed conveyor arranged in series with an adjacent to said feed conveyor assembly, a second pressing means disposed at a predetermined fixed position above and adjacent to the front end of said constant-speed conveyor, said second pressing means being adapted to rotate about its own axis at substantially the same linear speed as the speed of said constant-speed conveyor, a control unit for controlling the speed of at least the rear end portion of said feed conveyor assembly at a speed inversely proportional to the weight of a dough portion measured so as to make constant the weight of dough per unit length.

According to the present invention, a method of quantifying the flow rate of dough is furthermore provided, which comprises registering a reference conveying weight of dough per unit time, continuously measuring the weight of portions of the dough conveyed per unit time, comparing the resulting measurements with said reference conveying weight of dough and changing the speed of a feed conveyor at a speed inversely proportional to the dough weight measured, thereby making constant the weight of dough per unit length.

BRIEF DESCRIPTION OF THE DRAWINGS

FIG. 2 is a block diagram of a control unit of an embodiment of the present invention.

FIG. 5 is a perspective view of a pressing means having helical projections on its outside forming a portion of an embodiment of the present invention.

DESCRIPTION OF THE PREFERRED EMBODIMENTS

Figure 1:
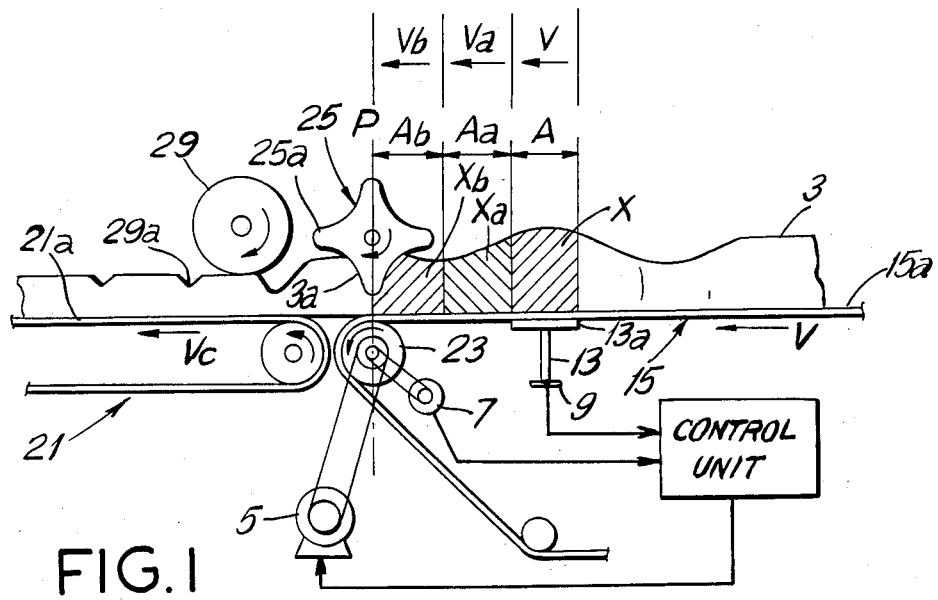
FIG. 1 is a side elevation view showing a first embodiment of the present invention.

As shown in FIG. 1, the apparatus of the present invention comprises a feed conveyor 15 and a constant-speed conveyor 21, and the two conveyors form a conveyance plane with their belts 15a and 21a. A weighing device 13 is disposed at a predetermined position underneath the lower surface of the belt 15a of the feed conveyor 15, and the portion of the weighing device 13 making contact with the belt 15a provides a weighing table 13a having a length A. A load sensor 9 measures the weight X of dough passing over the weighing table 13a, and the measured values are applied to a microcomputer 41 in a control unit described later.

A driven roller 23 which drives the conveyor 15 is driven by a motor 5, and a rotation transducer 7 which rotates in synchronism with the driven roller 23 is provided to generate pulses indicative of the velocity of the belt 15a.

The constant-speed conveyor 21 arranged adjacently to the end portion of the feed conveyor 15 is driven at a constant speed. Two pressing means are positioned in the form of rollers 25 and 29 at a predetermined fixed position above and adjacent to the end of the feed conveyor 15 and the front end of the constant conveyor 21 respectively. The roller 25 has four projections 25a and rotates about its own axis at substantially the same linear speed as the speed of the belt 15a to form compressed portions 3a on the upper surface of the dough 3. As explained later, roller 25 can be without any projections. The roller 29 is a rotary member provided either with projections or without them and acts so that the dough 3 transferred onto the constant-speed conveyor 21 is strongly pressed against the constant-speed conveyor 21 to move the dough 3 at exactly the same speed as that of the constant-speed conveyor 21.

As shown in FIG. 2, a control unit employed in the present invention includes a microcomputer 41 as its principal component, and the measured values from the load sensor 9 and the pulses from the rotation transducer 7 are applied to the microcomputer 41. A power source 45 applies a voltage to the load sensor 9 where the weight of the dough 3 is sensed and converted into voltages in proportion to the weight measured. A sensor amplifier 49 amplifies the sensor voltage. A low-pass filter 51 permits only the passage of frequencies lower than 10 Hz from the sensor voltage. Since the sensor voltage includes noise due to vibration of the conveyor, etc., the low-pass filter 51 is used to remove such noise, so that frequencies higher than 10 Hz are cut off to improve the S/N ratio. The noise-free sensor voltage is transmitted to a control circuit of the microcomputer 41 through an A/D converter 54. The A/D converter 54 serves for converting an alternating current from the low-pass filter 51 into a direct current. It is often the case that the load sensor 9 produces sizable voltages due to extraneous objects on the conveyor even when it carries no dough, and in such an instance the voltage indication must be adjusted to zero. To achieve this, the output from the low-pass filter 51 is transmitted to a control circuit of the microcomputer 41, where a signal is produced to set the output voltage from the sensor amplifier 49 at zero. A D/A converter 53 serves for converting a direct current from the microcomputer 41 into an alternating current. A dough weight input switch 47 acts as means for setting a production rate per unit time. A timing circuit of the microcomputer 41 receives from a rotation transducer 7 pulses corresponding to the length of movement of the belt 15a.

The microcomputer 41 computes in response to the input values so as to control the drive motor 5, and consequently, the driven roll 23 of the conveyor 15 through an inverter 43.

When the weight of the unit length A of the dough 3 is heavy, the motor 5 is driven at a lower speed $V_a$, while, when the weight of the unit length A of the dough is light, the motor 5 is driven at a higher speed $V_b$.

The roller 25 above and adjacent to the rear end of the feed conveyor 15 produces compressed portions 3a in the dough 3 so that the dough can always move at the same speed as that of the feed conveyor 15. The roller 29 also holds the dough 3 and the dough is conveyed at a constant speed by the constant-speed conveyor 21. The dough from the feed conveyor 15, by the cooperative action of the roller 25 and the belt 15a, is fed at various speeds controlled with the control unit thereby stretching or compressing the dough between the rollers 29 and 25.

The operation of the individual constituent members of the apparatus of the invention will now be described.

A production rate of dough per unit time is applied to the microcomputer 41 by a dough weight input switch 47 to register a reference conveying weight of dough. The dough 3 previously shaped into a web form is placed on the feed conveyor 15 by the operator, and the weighing device 13 measures the weight of the unit length A of the dough 3 being conveyed on the feed conveyor 15. That is, each time the rotation transducer 7 detects that the dough has been conveyed by a distance equal to or shorter than the length A, the microcomputer 41 applies a measurement command to the weighing device 13, and, in response to the above command, the load sensor 9 applies the measured value X as an input to the microcomputer 41.

Each time the arrival of a dough portion $A_n$, having a measured weight $X_n$ at the delivery end P of the feed conveyor 15, is detected by the microcomputer 41 as the result of the input applied from the rotation transducer 7, the microcomputer 41 calculates and automatically sets the velocity $V_n$ of the conveyor 15 corresponding to the measured weight $X_n$ of the dough portion $A_n$. When the weight $X_a$ of the unit length A of the dough 3 is heavier than the reference value, the dough 3 is conveyed at a lower speed $V_a$, and when the weight $X_b$ of the unit length A of the dough 3 is lighter than the reference value, the dough 3 is conveyed at a higher speed $V_b$. The relation between the speed of the conveyor 15 and the weight of the dough portion is expressed as follows:

$$X_a \cdot V_a = X_b \cdot V_b = \text{constant}$$

The measurements are compared with the reference conveying weight of dough by the microcomputer 41 and the difference between the reference conveying weight and the measurements are transmitted to an inverter 43 through a D/A converter 53, as signals. The signals are changed into values inversely proportional to the measurements to drive a motor 5. Thus, the speed V of the dough portion delivered from the conveyor 15 is inversely proportional to the weight X of the dough portion.

When the dough being conveyed on the feed conveyor 15 is divided into dough portions $A_a$, $A_b$, ..., each having the unit length A, they have necessarily different weights X. Therefore, for each of the individual weighed portions of the dough conveyed by the feed conveyor 15 and arriving at the conveyor's delivery end P, the conveyor 15 is driven at a speed V which always changes. The speed decreases when the measured weight is heavier than the standard value, while it increases when the measured weight is lighter than the standard value.

Therefore, during the transfer of the dough onto the constant-speed conveyor 21, a dough portion having a heavy unit weight is stretched while, a dough portion having a light weight is compressed. Thus, a dough web 3 having a constant unit weight is conveyed onto the constant-speed conveyor 21, thereby quantification being achieved.

In the apparatus of the invention, the two rollers 25 and 29, one disposed at a predetermined fixed position above the rear end of the feed conveyor 15 and the other disposed at a predetermined fixed position adjacent to the front end of the constant-speed conveyor 21, act as dough pressing devices for accurately stretching and compressing the dough 3 in proportion to the difference between the velocity of the two conveyors 15 and 21.

By the provision of the rollers 25 and 29, the dough 3 is stretched or compressed only between these two rollers. If these two rollers 25 and 29 were not present, the dough 3 would not be stretched or compressed within an area of a predetermined short length. When a relatively hard dough is used, it is preferable that the rollers 25 and 29 have projections on their surface. On the other hand, in the case of weighing a soft dough, the effect of quantification of the flow rate of the dough can be achieved even when no projections are provided on the surface of each of those rollers.

In the aforementioned embodiment of the present invention, the unit length A of the weighing table 13a of the weighing device 13 can be freely selected. Therefore, when the length A is selected to be a short distance, the weight of the dough can be measured more accurately. The change in the measurement of weight of the dough can thus be more precisely differentiated, and the differentiated values of weight change are converted into inversely proportional speeds at the delivery end of the dough feed conveyor 15. In this manner, the speed of the conveyor 15 during transfer of the dough between the converyors is minutely controlled so that quantification of the dough can be accurately achieved.

In the present invention, the roller 25 is illustrated as having projections 25a. The rollers 25, however, is not necessarily required to have projections. The interval between the projections may be progressively narrowed to facilitate accurate weighing. If the interval is narrowed to the extreme, the roller will become a cylindrical one. Such a roller is also within the concept of this invention. Again, any other suitable pressing device may also be employed. For example, a plate having a predetermined width may be employed, and it may be intermittently vertically moved in relation to the movement of the dough.

Figure 3:
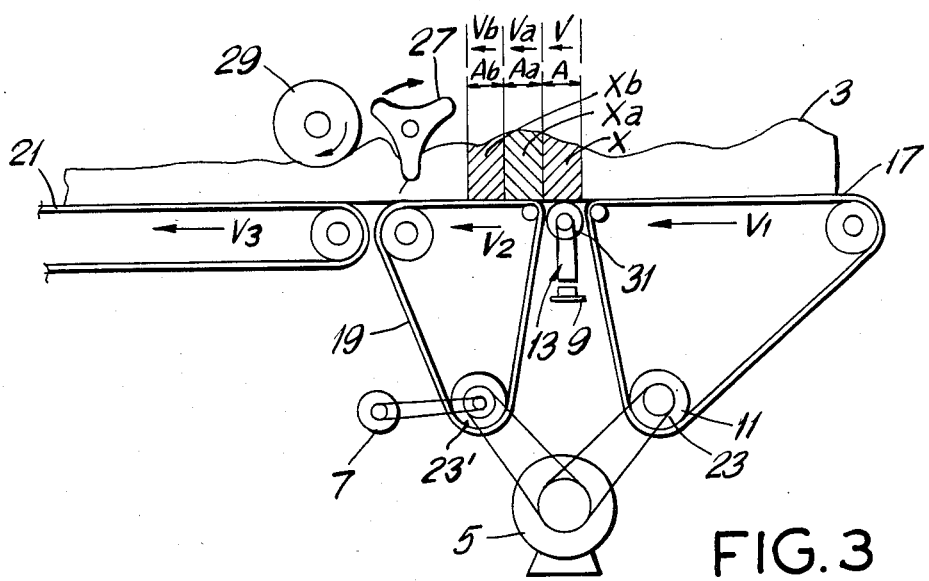
FIG. 3 is a side elevation view showing a second embodiment of the present invention.

A second embodiment of the invention will next be described. As shown in FIG. 3, there are provided two feed conveyors 17 and 19 and a weighing device 13 is disposed between the two conveyors.

A constant-speed conveyor 21 is arranged in series with a second feed conveyor 19 and pressing means 27 and 29 are disposed in the same relative positions as that in the first embodiment. A first feed conveyor 17 and the second feed conveyor 19 are both driven by a motor 5, through driven rollers 23 and 23' respectively. A rotation transducer 7 is associated through a transmitting means with the driving part of the second feed conveyor 19. The first feed conveyor 17, a roller 31 of the weighing device 13, the second feed conveyor 19, and the constant-speed conveyor 21 form a conveyance plane. Normally, the first and second feed conveyors 17 and 19 are driven at the same speed by the motor 5, but the movement of the first feed conveyor 17 can be stopped when necessary. A clutch 11 is mounted on the rotary shaft of the driven roller 23 so that transmission of the rotary movement of the motor 5 can continue or be interrupted. A maximum weight value of the dough portions to be weighed by the weighing device 13 is previously set. When the weight of the dough portions conveyed from the first feed conveyor exceeds the set value, the clutch 11 associated with the driven roller 23 of the first feed conveyor 17 is actuated to interrupt transmission of the drive force of the motor 5 to the first feed conveyor 17, so that the conveying movement of the first feed conveyor 17 is stopped until the weight of the dough falls below the set value.

While the first feed conveyor 17 stays still, the dough 3 on the weighing device 13 is stretched between the first feed conveyor 17 and the second feed conveyor 19, resulting in a reduced weight. Therefore, the weight of the dough transferred onto the second feed conveyor 19 becomes reduced to fall within a certain predetermined range, so that the quantifiable range of the dough weight can be further improved.

Figure 4:
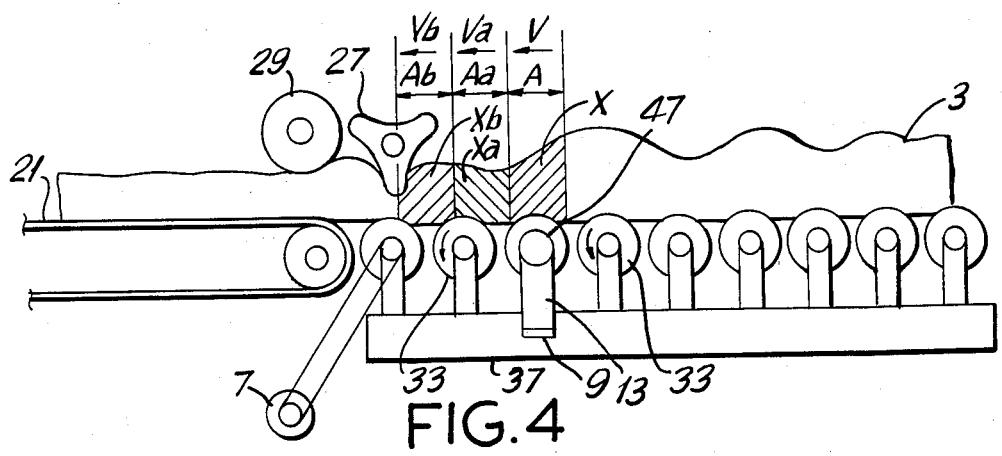
FIG. 4 is a side elevation view partly showing a third embodiment of the present invention.

A third embodiment of the present invention will next be described. As shown in FIG. 4, a plurality of revolving rollers 33 are juxtaposed to constitute a rollers conveyor assembly 37, which is used for conveyance of dough 3. One of the roller 33 is replaced with a load-receiving roller 47 to function as a weighing device 13, and a load sensor 9 is associated with the load-receiving roller 47 to measure the weight of the dough passing over it. The rollers 33 rotate in synchronism with one another, while, the roller 47 rotates either freely or driven by a motor built in them.

The manner of control is such that, when the weight of a unit length A of the weighed dough 3 is relatively heavy, the motor 5 decreases the rotation speed of the roller 33, while, when the weight of a unit length A of the weighed dough 3 is relatively light, the motor 5 increases the rotation velocity of the rollers 33. Also, when the load sensor 9 senses a weight heavier than a predetermined value, the rotation of the rollers 33 upstream of the weighing device 13 is stopped until the weight becomes lighter than the predetermined value.

In the second and third embodiments, the roller 31, 47 may be driven by the motor built in the roller so that the load except for the weight of the dough, may not act upon the sensor, thereby further improving the accuracy. If the motor were externally positioned and the force causing the rotation of the roller 47 were transmitted therefrom, the moment of rotation of the roller shaft, driven by the external source, would act upon the load sensor 9 as a load other than the weight of the dough, making accurate measurement impossible. Again, even if a freely rotatable idle roller is used, the surface friction on the roller changing from time to time due to the movement of the dough in turn causes the movement of the dough to change, thereby providing the load sensor with inaccurate information affected by extraneous noises and impairing precise measurement.

According to the apparatus of the present invention, which has a constitution as described above, the weight of dough can be easily maintained constant while the dough is being conveyed, even when the dough is fed in a non-uniform state.

When the present invention is applied to a bread-making process, the bread-making apparatus can be reduced in scale because the gel structure of the dough is not destroyed and no steps to restore the gel structure are required.

Further, although the aforementioned embodiments have referred to the handling of bread dough by way of example, the present invention is in no way limited to such embodiments, and it is apparent in view of the constitution thereof that the present invention is also applicable to an apparatus conveying other elastic and viscous materials such as high-molecular materials, besides foodstuffs such as noodles and fish pastes, while quantifying the flow rate thereof.

I claim:

1. An apparatus for quantifying the flow rate of dough, comprising a feed conveyor assembly for continuously feeding the dough, a dough weighing device continuously measuring the weight of each portion of the dough conveyed past the weighing device, said dough weighing device being located between the opposite ends of the conveying portion of said feed conveyor assembly, a first pressing means disposed at a predetermined fixed position above and adjacent to the rear end of said feed conveyor assembly, said first pressing means being adapted to rotate about its own axis at substantially the same linear speed as the conveyor speed of at least the rear end portion of said feed conveyor assembly, a constant-speed conveyor arranged in series with and adjacent to said feed conveyor assembly, a second pressing means disposed at a predetermined fixed position above and adjacent to the front end of said constant-speed conveyor, said second pressing means comprising a single roller element adapted to rotate about its own axis at substantially the same linear speed as the speed of said constant-speed conveyor, a control unit for controlling the speed of at least the rear end portion of said feed conveyor assembly at a speed inversely proportional to the weight of a dough portion measured so as to make constant the weight of dough per unit length.

2. An apparatus according to claim 1, wherein a feed conveyor assembly comprises a first feed conveyor and a second feed conveyor arranged in series with said first feed conveyor, and a weighing device located between said two conveyors.

3. An apparatus according to claim 1, wherein a feed conveyor assembly comprises one or more belt conveyors.

4. An apparatus according to claim 1, wherein a feed conveyor assembly is a roller conveyor having a plurality of rollers, and one of rollers of said roller conveyor is replaced with a weighing device having a roller for contacting with the dough being conveyed to receive the load of the dough.

5. An apparatus according to claim 2, wherein said weighing device includes a roller revolving about its own axis with a built-in motor.

6. An apparatus according to claim 3 wherein said weighing device includes a roller revolving about its own axis with a built-in motor.

7. An apparatus according to claim 2, further comprising means for stopping said first feed conveyor when the value of weight of the dough portions exceeds a control value until such a situation is removed.

8. An apparatus according to claim 2, further comprising means for driving only said second feed conveyor at a speed inversely proportional to the weight of a dough portion measured.

9. An apparatus according to claim 1, wherein said first pressing means is a rotary member having helical projections on its outside surface.

10. An apparatus according to claim 4, wherein said weighing device includes a roller revolving about its own axis with a built-in motor.

* * * * *